United States Patent
Duis et al.

(10) Patent No.: US 8,764,310 B2
(45) Date of Patent: Jul. 1, 2014

(54) APPARATUS AND METHOD FOR ALIGNING OPTICAL TRANSPORTS IN A FERRULE

(75) Inventors: Jeroen Antonius Maria Duis, Didam (NL); Jan Willem Rietveld, Benschop (NL); Joseph Gerardus Maria Vos, Elsendorp (NL)

(73) Assignee: Tyco Electronics Nederland B.V., 'S-Hertogenbosch (NL)

( * ) Notice: Subject to any disclaimer, the term of this patent is extended or adjusted under 35 U.S.C. 154(b) by 564 days.

(21) Appl. No.: 12/855,790

(22) Filed: Aug. 13, 2010

(65) Prior Publication Data

US 2012/0014650 A1   Jan. 19, 2012

Related U.S. Application Data

(63) Continuation-in-part of application No. 12/836,928, filed on Jul. 15, 2010, now Pat. No. 8,582,945.

(51) Int. Cl.
*G02B 6/38* (2006.01)
*G02B 6/26* (2006.01)
*G02B 6/36* (2006.01)
*G02B 6/00* (2006.01)

(52) U.S. Cl.
CPC ............ *G02B 6/3898* (2013.01); *G02B 6/3839* (2013.01); *G02B 6/3885* (2013.01); *G02B 6/387* (2013.01)
USPC ................... 385/65; 385/53; 385/72; 385/83; 385/137

(58) Field of Classification Search
CPC ... G02B 6/3898; G02B 6/3839; G02B 6/3885
USPC ........... 385/52, 53, 59, 60, 65, 72, 76, 77, 78, 385/81, 83, 92, 129, 137, 139
See application file for complete search history.

(56) References Cited

U.S. PATENT DOCUMENTS

| | | |
|---|---|---|
| 5,394,495 A | 2/1995 | Booth et al. |
| 6,097,871 A | 8/2000 | De Dobbelaere et al. |
| 6,293,708 B1 | 9/2001 | Ohtsuka et al. |
| 6,519,393 B2 | 2/2003 | Booth et al. |

(Continued)

FOREIGN PATENT DOCUMENTS

WO      WO 02/06871 A1     1/2002

OTHER PUBLICATIONS

International Search Report, International Application No. PCT/US2011/001196, International Filing Date Jul. 8, 2011.
"Polyguide(tm) Polymeric Technology for Optical Interconnect Circuits and Components", Booth et al., DuPont Company, date unknown.
Article obtained from www.thefreelibrary.com; "Siemens Fiber Optics and AMP Enter Multisource Agreement for Multi-Gigabit Parallel Optical Links", Business Wire, Feb. 23, 1998.

(Continued)

*Primary Examiner* — Kaveh Kianni
*Assistant Examiner* — Hung Lam

(57) ABSTRACT

A method and apparatus for aligning optical transports in a ferrule. The transports are aliened in the ferrule by mounting the ferrule on a jig having grooves into which the ends of the optical transports are inserted for transversely aligning the fibers in the ferrule. A row of transports is placed in the ferrule cavity with the front ends of the transports extending past the ferrule and into the grooves of the jig, thereby laterally aligning the transports with the grooves. The fibers are affixed to the ferrule. The ferrule can then be removed from the jig and the front ends of the transports that extended into the grooves of the jig cleaved flush with the front face of the ferrule.

13 Claims, 12 Drawing Sheets

(56) References Cited

U.S. PATENT DOCUMENTS

| | | |
|---|---|---|
| 6,631,228 B2 | 10/2003 | Gao et al. |
| 6,722,791 B2 * | 4/2004 | Cheng et al. .................. 385/83 |
| 6,817,777 B1 | 11/2004 | Grabbe |
| 7,369,728 B1 | 5/2008 | Hasegawa et al. |
| 7,447,405 B1 | 11/2008 | Yamada et al. |
| 8,582,945 B2 | 11/2013 | Duis et al. |
| 2002/0146216 A1 * | 10/2002 | Schofield et al. .............. 385/83 |
| 2005/0031291 A1 | 2/2005 | Gao et al. |

OTHER PUBLICATIONS

Article obtained from www.highbeam.com; "Infineon Technologies Licenses Parallel-Optical-Link—Paroli—Modules to Molex, Crating Second Source for High-Performance Fiber Optic Data Link", Business Wire Press Release, Aug. 25, 2000.

"VCSELs for datacom applications", Wipiejewski et al., date unknown.

"Paroli", obtained from hsi.web.com; date unknown.

* cited by examiner

APPARATUS AND METHOD FOR ALIGNING OPTICAL TRANSPORTS IN A FERRULE

RELATED APPLICATION

This application is a continuation in part of U.S. patent application Ser. No. 12/836,928 files Jul. 15, 2010 now U.S. Pat. No. 8,582,945, which is incorporated fully herein by reference.

FIELD OF TECHNOLOGY

The invention pertains to optical connectors. More particularly, the invention pertains to a method and apparatus for aligning optical transports in a ferrule during assembly of an optical connector.

BACKGROUND

Typically, an optical signal transported over an optical transport, such as an optical fiber or waveguide (hereinafter collectively optical transport) must be coupled from that optical transport to another optical transport or to an optoelectronic device. Thus, the end of the optical transport is assembled to an optical connector of a given form factor, e.g., MT, which connector can be coupled to a mating optical connector on the other optical transport or optoelectronic device.

Optical cables that are connected to each other through a pair of mating connectors may comprise a single optical transport. However, more and more commonly, optical cables contain a plurality of optical transports, and the light in each optical transport in the cable is coupled through a pair of mating connectors to a corresponding optical transport in another cable. Optical cables and connectors having more than 1000 transports or more are now available on the market.

In a typical optical fiber, for instance, the light is generally contained only within the core of the fiber, which typically may be about 10 microns in diameter for a single-mode fiber or about 50 microns in diameter for a multi-mode fiber. Waveguides are about equally as small in cross-sectional area, although they generally are rectilinear in cross-section (rectangular or square, rather than cylindrical). Accordingly, lateral alignment of the transports in one connector with the transports in the other connector must be very precise, such as on the order of 1-2 microns tolerances in order to assure that most of the light makes it through the connectors into the receiving transport. Hence, optical connectors generally must be fabricated extremely precisely to ensure that mating optical transports longitudinally align as well as possible so that as much light as possible is transmitted through the mating connectors to minimize signal loss during transmission.

Typically, an optical connector comprises a ferrule assembly that includes a separate cavity for each optical transport in the cable. Each optical transport is inserted into one of the cavities, which precisely aligns the transport laterally, i.e., horizontally and vertically (x and y planes) relative to some reference point on the ferrule assembly, such as an alignment pin and/or alignment hole that will mate with a corresponding alignment hole or pin on a mating connector. The optical transports will then be cut or polished flush with the front face of the ferrule assembly to make the ends of all of the transports coplanar (in the longitudinal or z direction).

The ferrule assembly then is placed in a connector housing that typically includes a mechanism for coarsely aligning the ferrules of two connectors when first mated and guiding the ferrules into engagement with the each other as well as a mechanism for releasably locking the two connectors together.

Such ferrules are commonly manufactured by injection molding and are relatively expensive and complex to manufacture because they have complex shapes and require significant polishing of many surfaces in order to achieve the desired tolerances. Typical tolerances for optical transport alignments are about 1-2 microns.

SUMMARY

The invention pertains to methods and apparatus for aligning optical transports in a ferrule. Particularly, the ferrule has an open side through which optical transports may be inserted into a transport cavity in the ferrule from a direction transverse the longitudinal direction of the optical transports. To assemble the transports in the ferrule, the ferrule is mounted on a jig via mating fine lateral alignment features on the ferrule and the jig. The jig has a cavity substantially identical to the ferrule's cavity that is transversely aligned with the ferrule cavity. The jig has grooves in a surface of the cavity into which grooves the ends of the optical transports will be inserted for transversely aligning the fibers in the ferrule. The fibers are then placed in the aligned cavities of the ferrule and jig through the open sides of the ferrule and jig so that the front ends of the optical transports extend past the front end of the ferrule and lie in the grooves of the jig, thereby aligning the transports with the grooves in both dimensions lateral to the longitudinal dimensions. The fibers are affixed to the ferrule and the ferrule may be removed from the jig. The front ends of the optical transports that extended into the grooves of the jig are then cleaved or otherwise made flush with the front face of the ferrule. Additional rows of optical transports may be inserted, aligned, affixed, and cleaved in the same manner using different jigs, each different jig having its grooves positioned differently relative to the fine alignment feature of the jig.

C-shaped grooves of more than 180° of arc can provide enhanced freedom of alignment with respect to at least certain types of waveguide optical transports because C-shaped grooves separate the horizontal alignment from the vertical alignment. Specifically, horizontal alignment is effectuated by the edges at the opposing ends of the arc engaging the optical transports, and vertical alignment is effectuated by the continuous cladding layer of the row of waveguides resting on the tops of the grooves.

With regard to small-pitch fiber arrays for which it might be difficult to manufacture grooves of sufficiently small size in a single piece, each jig may comprise two pieces, with each piece providing half of the groove, and the two pieces aligned one behind the other in the longitudinal direction.

DETAILED DESCRIPTION OF EMBODIMENTS

Figure 1A:
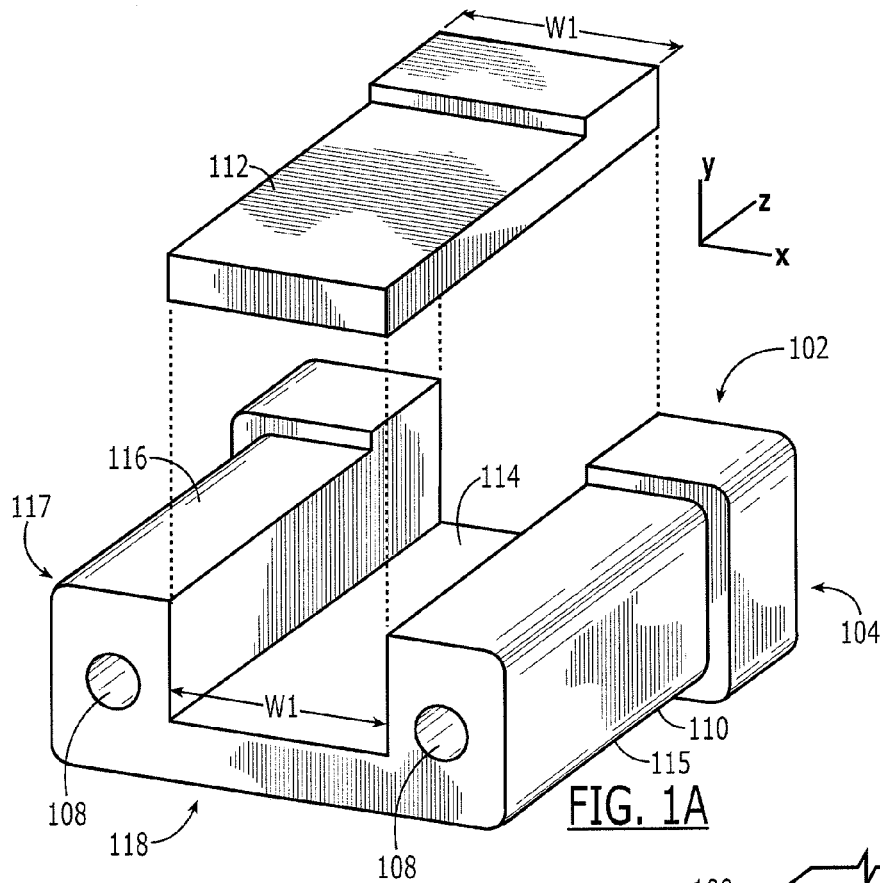
FIG. 1A is a perspective view of a ferrule in accordance with a first embodiment of the invention.
Figure 1B:
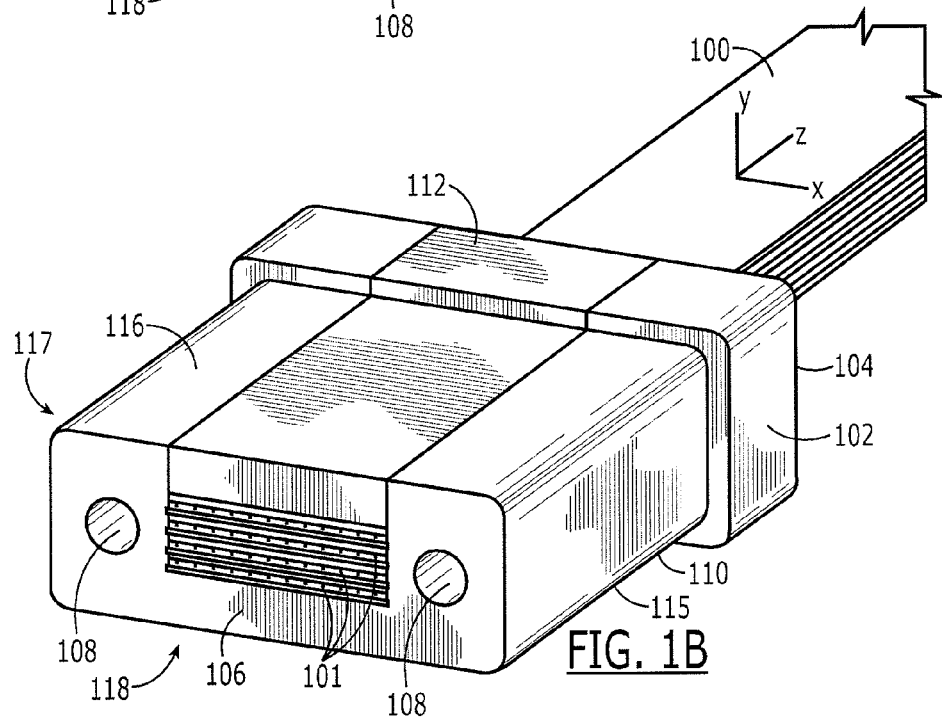
FIG. 1B is a perspective view of the ferrule of FIG. 1A assembled with to the end of an optical cable having multiple optical transports.

FIG. 1A is a blow-up perspective view of a ferrule 102 in accordance with a first embodiment of the present invention. FIG. 1B is a perspective view of an optical transport cable 100 terminated within the ferrule 102 in accordance with the first embodiment of the invention. The exemplary cable comprises 48 optical transports 101 arranged as four stacked waveguide layers 103, each comprising 12 optical transports 101. The ferrule may further be encased within a connector housing adapted to mate with a corresponding connector to provide a complete optical cable assembly. However, in order not to obfuscate the invention, only the ferrule and the cable are shown and no connector housing is shown, it being understood that the assembled ferrule/cable combination would generally further be assembled to a connector housing to complete a cable assembly. The ferrule comprises a main body 110. As is common, the ferrule body 110 comprises a front face 106 at which face the optical transports 101 in the cable are terminated and a rear face 104 through which the cable 100 enters the ferrule. This exemplary ferrule main body 110 is generally rectilinear, and therefore has four lateral faces running longitudinally between the front and rear faces 104, 106, namely a right side face 115, a top face 116, a left side face 117, and a bottom face 118. Cylindrical and othershaped ferrules are also well known. Further, as is typical, the front face 106 of the ferrule 102 includes one or more alignment features for precisely aligning the ferrule (and, thus, the optical transports within it) with the ferrule of a mating connector. In this case, the alignment features are alignment holes 108 for accepting mating alignment pins on a mating ferrule. Main body 110 defines a longitudinal cavity 114 running fully between the rear face 106 and the front face 108 for receiving the optical transports 101 there through. Cavity 114 is generally rectilinear in this embodiment. The illustrated cavity is uniform throughout its length, but this is merely exemplary. The cavity, for instance, may have an enlarged portion at the rear of the cavity to allow for a greater thickness of adhesive for purposes of providing strain relief for the cable at the rear of the ferrule.

Unlike most conventional ferrules, the cavity 114 for accepting optical transports also is open to a lateral side of the ferrule body 110, namely, top face 116. In the prior art, the cavity for the optical transports typically is a through bore with no opening to a lateral side of the ferrule body, except possibly a small opening for permitting adhesive to be injected into the ferrule for bonding the fibers in the ferrule cavity. Therefore, the optical transports must be inserted into the ferrule in the longitudinal direction (the z direction in FIGS. 1A and 1B). In the present invention, on the other hand, optical transports may be inserted into the cavity 114 in a lateral direction or a longitudinal direction.

A cover piece 112 to close off the lateral opening after the ferrule and cable have been assembled together is optional.

Generally, the optical transports must be assembled in the ferrule with their lateral orientations extremely precisely aligned relative to the alignment features (e.g., the alignment holes 108) of the ferrule so that they will align very precisely with mating optical transports in a mating connector.

Figure 2:
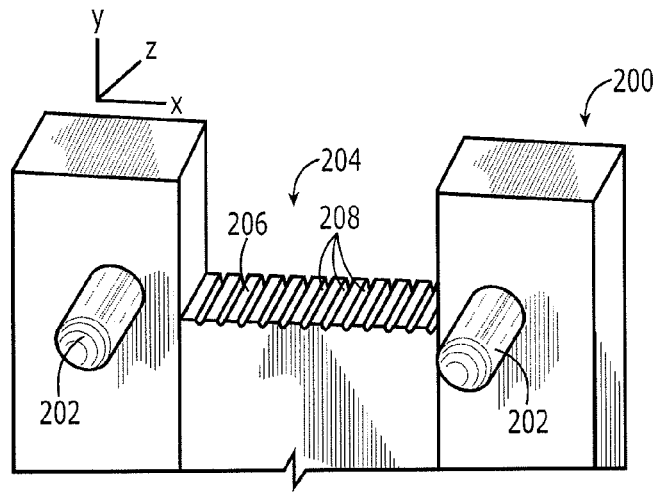
FIG. 2 is a perspective view of a first jig for assembling optical transports to a ferrule in accordance with the first embodiment of the invention.

FIG. 2 is a perspective view of a jig 200 designed to be used with a ferrule such as ferrule 102 to align the optical transports in the cavity of the ferrule very precisely relative to the alignment holes 108. The jig 200 includes alignment features for mating with the alignment features 108 on the ferrule. In this case, the alignment features are alignment pins 202 for mating with the alignment holes 108 on the ferrule. Of course, the pins and holes could be reversed between the jigs and the ferrules or one pin and one hole could be provided on each of the jig and the ferrule. The jig 200 includes a cavity 204 substantially similar in cross section (x-y plane) to the cavity 114 of the ferrule 102. The surface 206 of the cavity 204 opposite the open side incorporates a plurality of grooves 208.

In one embodiment particularly suited for use in connection with waveguide optical transports or any other generally rectilinear optical transport, as illustrated, the grooves are generally C-shaped in cross-section comprising an arc segment of a circle preferably greater than 180°. In other embodiments for use in connection with cylindrical optical transports such as typical optical fibers, grooves of alternate shapes, such as V-shaped grooves or arc segment grooves comprising 180° or less of arc may be more preferable. In any event, the grooves 208 are aligned very precisely in the horizontal, x, direction relative to the alignment pins 202 to correspond to the desired horizontal alignment of the optical transports in the ferrule. The height of bottom wall 206 also is set very precisely relative to the height of the alignment pins 202 to correspond to the desired height of the optical transports in the ferrule 102.

Figure 4:
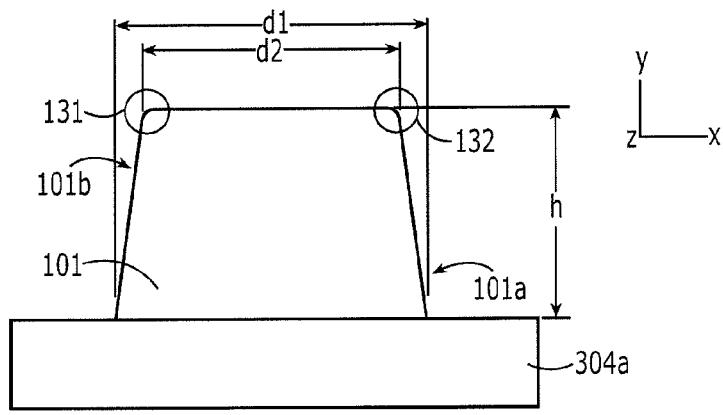
FIG. 4 is a close up view of a waveguide core.

As will be described in more detail in connection with FIGS. 4A-4O, the mounting holes 108 on the ferrule 102 will be mounted on the mounting pins 202 of the jig 200 to align the cavity 204 of the jig 200 with the cavity 114 of the ferrule 102 essentially in the same manner that the cavities of two mating ferrules would align with each other when two mating connectors are brought together. Then, the optical transports 101 will be laid in the now-aligned ferrule cavity 114 and jig cavity 204 with each optical transport in a corresponding groove 208 in order to precisely laterally (in the x-y plane) align the optical transports at the front face 106 of the ferrule 102. The optical transports 101 will be adhered in this position and then the ferrule 102 can be removed from the jig 200 and any portions of the optical transports 101 protruding beyond the front face 106 of the ferrule 102 can be removed, such as by laser cleaving, cutting, and/or abrasive polishing.

Since the jig 202 is completely uniform in the longitudinal direction (z), it can be manufactured using two dimensional wire EDM (Electron Discharge Machining), and thus can be manufactured very precisely yet inexpensively. Wire EDM can provide tolerances of less than 1 micron. Furthermore, the jig can be made in one quick wire EDM manufacturing process. However, the wires used in wire EDM have a thickness such that internal features of a work piece generally cannot be formed smaller than the thickness of the wire.

With respect to optical fibers, as is typical in optical connectors, the front ends of the fibers in the ferrule are stripped of their insulation, leaving only the core and cladding, which is generally cylindrical. Accordingly, when the cylindrical cores are laid into the grooves, they will sit in the grooves in a very precise position relative to the groove with the cylindrical profile making contact with the walls of the v-groove at two points.

Figure 3:
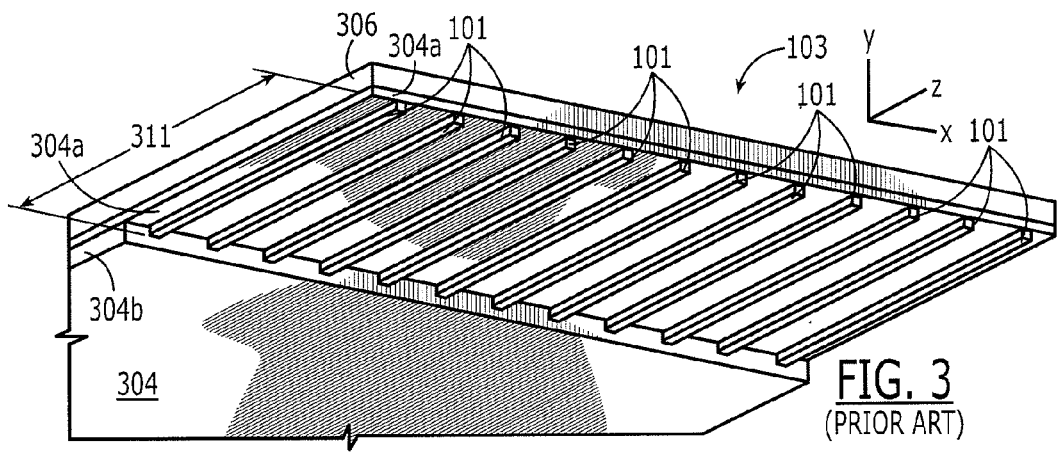
FIG. 3 is a perspective view of a row of waveguides prepared for alignment in accordance with the principles of the first embodiment of the invention.

Optical waveguides, on the other hand, are processed differently for assembly in the cavity 114 of the exemplary ferrule 102 of the invention. FIG. 3 is a perspective view of a layer of optical waveguides such as one of the layers 101 shown in FIG. 1B. It comprises twelve parallel optical wave guides 101 embedded in planar cladding 304 supported on a polymer mechanical support substrate layer 306. Waveguides typically are manufactured in a planar manner using epitaxial layer processes commonly associated with printed circuit board manufacturing. For instance, a first layer 304*a* of cladding is deposited on top of a mechanical support substrate 306. (Please note that the waveguide layer 103 is shown upside down in FIG. 3 as compared its orientation during fabrication as described herein). Then, using conventional photolithography techniques, a plurality of strips of waveguide core material is deposited on top of the first cladding layer 304*a* to form the waveguides 101. For example, a layer of photoresist is deposited over the first cladding layer 304*a*, the photoresist is developed through a photolithography mask corresponding to the desired pattern of the waveguides 101, the core material, typically initially a liquid, is deposited over the developed photoresist and cured, the remaining photoresist is washed away (taking away any of the core material deposited on it, thus leaving the waveguide cores 101 on the first cladding layer 304*a*. Then, a second layer of cladding 304*b* is deposited over the first cladding layer 304*a* and waveguides 101.

The waveguides 101 formed in this manner are generally rectilinear, as illustrated in FIG. 3. However, due to various factors during fabrication, they are not perfectly rectangular in cross-section. For instance, with reference to FIG. 4, which shows a close up cross-sectional view of a typical waveguide, the waveguide 101 commonly is thicker at its base 101*a* than at its top 101*b*, as illustrated by measurements D1 and D2 in FIG. 4, due to the divergence of the light used to cure the waveguide material during fabrication. Furthermore, the top corners 131, 132 of the waveguide 101 tend to become rounded due to surface tension in the waveguide material during curing of the waveguide material during fabrication. Finally, generally in many epitaxial fabrication processes, the horizontal dimension, x, of structures is fabricated to better tolerances than the vertical dimension, y, because the horizontal dimensions of the material are primarily dictated by the photolithography mask and photolithography process, whereas the height, h, of the material is primarily dictated by the material deposition process.

In order to allow the waveguide cores 101 to be laterally aligned by placement within the cavity 208 of the jig 200, the waveguides are fabricated so that the second layer of cladding 304*b* does not cover the front ends of the wave guide (e.g., the first 2 mm of the waveguide), as illustrated in FIG. 3. For instance, the waveguide layers 103 may be manufactured using a photolithography mask for the second cladding layer 304*b* that causes the top layer 304*b* to end about 2 mm short of the end of the first cladding layer 304*a* and the cores 101. Then, the remainder of the waveguide 300 that still includes the full cladding 304 can be placed in the cavity 114 of the ferrule 102 while the semi-exposed front ends of the cores (see reference numeral 311 in FIG. 3) extend into the cavity 204 of the jig with the cores 101 sitting in the 208 of the jig 200.

Figure 5A:
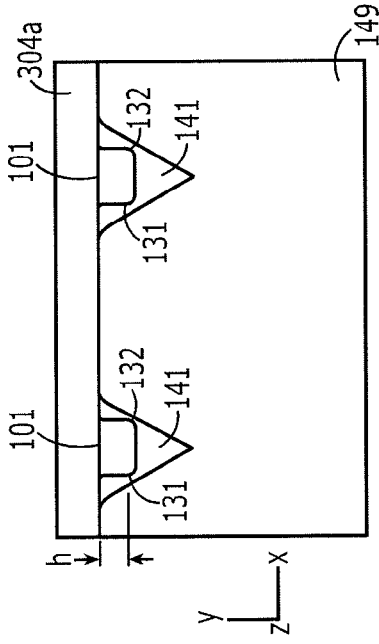
FIGS. 5A through 5D illustrate various different waveguide cores positioned on various aligned grooves in accordance with the principles of the present invention.

FIG. 5A is a close up view of a waveguide core 101 in a V-shaped groove 141. V-shaped grooves such as groove 141 work well for both cylindrical optical transports, such as optical fibers, as well as rectilinear optical transports, such as waveguide cores. Specifically, both cylindrical fibers and rectilinear waveguides will make contact with a V-shaped groove 141 at two points 143, 145 to properly position the waveguide 101 horizontally (x direction). Additionally, the vertical alignment of the waveguides 101 is controlled by the top surface 147 of the wall 149 bearing the grooves 141. More specifically, the lower cladding layer 304*a* is continuous and rests on the top surface 147 with the waveguides 101 extending down therefrom into the groove 141.

Optionally, grooves also can be placed in the bottom surface of the cavity 114 in the ferrule 102 to provide extra alignment precision with respect to at least the bottom-most row of optical transports.

Figure 5C:
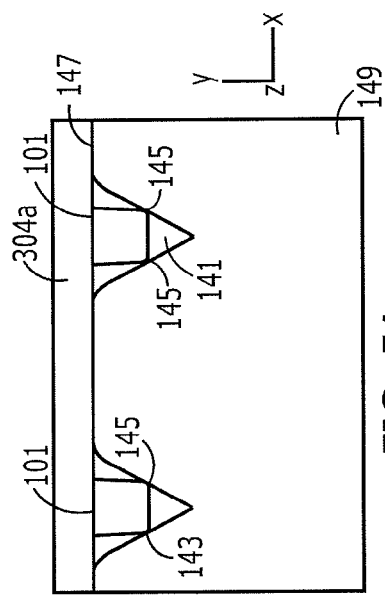
Figure 5B:
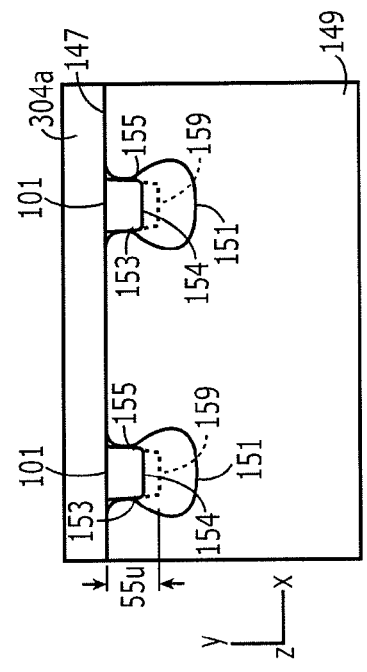

With V-shaped grooves, the horizontal alignment and the vertical alignment are interdependent, which may be undesirable in certain applications such as illustrated in FIG. 5B. Particularly, if the waveguide is shorter in the vertical dimension than expected, then the cladding layer 304*a* may contact surface 147 before the corners 131, 132 between the top surface 157 and the side walls 153, 155 of the core 101 make contact with the groove surface, thus permitting "play" in the horizontal alignment of the cores within the grooves. That is, if the core 101 is fabricated shorter than nominal in the vertical dimension, e.g., 45 microns rather than 50 microns, then both corners 131, 132 of the core 101 will not touch the groove surface. Thus, there is a range of horizontal positions within the groove 141 that the core 101 might be in because the groove 141 is wider than the core at the depth, h, of the corners 131, 132. The aforementioned facts that (1) the height of the core 101 is less well controlled than the horizontal dimension, (2) the corners 131, 132 may be rounded due to tension during curing, and (3) the top of the waveguide core 101 (which is the lower part in FIGS. 5A and 5B because the waveguides are shown upside-down as compared to their orientation during fabrication) may be less wide than the bottom can combine to amplify the problem of obtaining proper horizontal alignment of the cores 101.

Figure 5D:
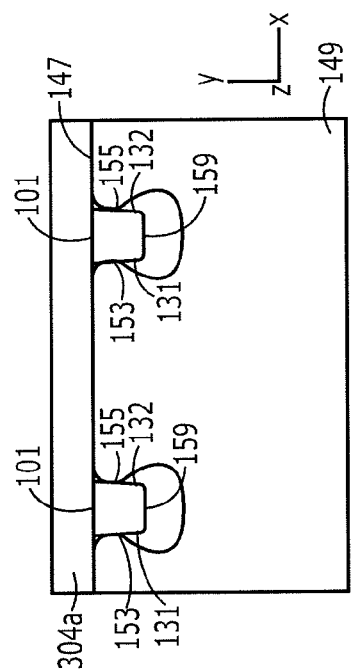

C-shaped grooves 151, such as illustrated in FIGS. 5C and 5D, solve this problem because they can be designed to completely separate the vertical alignment of the cores 101 from the horizontal alignment. Particularly, as seen in FIG. 5C, the vertical alignment of the cores 101 is still determined by the lower cladding layer 304*a* resting on the top surface 147 of the wall 149 bearing the grooves. The horizontal alignment, however, is slightly different. Specifically, if the arc of the C-shaped grooves 151 exceeds 180°, then the horizontal position of the core in the groove will be determined by the contact of the vertical sides 153, 155 of the cores 101 with the surface of the groove at the narrow top opening or mouth 157 of the groove, rather than the corners 131, 132 of the cores with the sides of the groove further down in the groove. This removes the possible dependence of the horizontal alignment of the core 101 on the height of the core (as long as the cores and grooves are manufactured within easily achievable tolerances). More particularly, if the groove is designed to guarantee that the vertical (or substantially vertical) side walls 153, 155 of the cores will contact the groove surface, rather than the corners 131, 132 of the side walls 153, 155 with the top wall 157, then the horizontal alignment of the core is substantially independent of (1) the vertical alignment of the core, (2) the height of the core and (3) any rounding of the corner 131, 132 of the core.

In order to assure that the sides 153, 155 of the core 101 contact the edges of the opening 157 and the corners 131, 132 do not contact the surface of the groove, the groove simply needs to be wider than the opening 157 (and the core 101) to a depth at least equal to the maximum possible depth below the surface 147 to which the core may extend (taking into consideration the core design and applicable core height tolerances).

Thus, as can be seen in FIG. 5D, if the height of the core is less than (or greater than, for that matter) nominal, it will have no effect on the horizontal alignment of the cores since, in either event, the corners 131, 132 of the core or top 159 of the core will not make contact with the surface of the groove. Particularly, FIG. 5D illustrates in solid line a particularly short core (having a height of 45 microns as opposed to the 50 micron nominal height or 10% shorter than nominal) and, in phantom, a particularly tall core (having a height of 55 microns or 10% taller than nominal). As can be seen, the top corners 131, 132 of either of these waveguides will have no effect on vertical or horizontal alignment of the waveguides in the grooves.

Hence, the horizontal alignment of the core (dictated by the contact of the vertical sides 153, 155 of the core 101 with the edges of the groove 141 in the opening 157) will be independent of the vertical alignment (dictated by the contact of the surface of the lower cladding layer 304a with the top surface 147).

The horizontal alignment (as well as vertical alignment) is still somewhat dependent on the fact that the side walls 153, 155 may not be perfectly vertical. However, because the cores are resilient and can be squeezed slightly, this sloping effect can actually be used to advantage. First, if the core is wider than the narrow opening 157 near the top of the groove such that the cladding layer 304a does not yet contact the top surface 147 when both of the side walls 153, 155 contact the surface of the groove at the mouth of the groove (and thus resist further downward movement of the core into the groove), the core can simply be forced further down into the groove (e.g., by the hot pressure/curing die) into proper vertical alignment, i.e., until the cladding 304a contacts the top surface 147. The core will simply be squeezed slightly in the horizontal dimension where the side walls 153, 155 contact the edges of the mouth of the groove. However, even further, if the core is trapezoidal and the top 101b of the core is narrower than the mouth 157, but the base 101a of the core is wider than the mouth 157 such that the core will readily enter the groove, but side walls 153, 155 will contact the surface of the groove 151 before the lower cladding layer 304a contacts top surface 147.

Hence, with the knowledge that the top of the core will likely be narrower than the base of core, the cores can be designed to have a slightly wider nominal width at the base 101a than the width of the mouth 157 so as to virtually guarantee that the base of the core will be wider than the mouth 157 (but the top 101b of the core may be narrower than the mouth). In this manner, it can be virtually assured that the base of the core will not be narrower than the mouth 157 (which would permit the undesirable horizontal "play" within the groove) and, thus, that the side walls 153, 155 of the core 101 will contact the opposing edges of the groove of the mouth 157, leading to accurate horizontal alignment without play. To the extent that the side walls 153, 155 contact the edges of the mouth prematurely so that the cladding layer 304A has not yet made contact with the top surface 147, the core 101 can simply be forced further down until the lower cladding layer 304a does make contact with the top surface 147. The core 101 will simply be slightly squeezed horizontally where it contacts the mouth 157 of the groove.

While FIGS. 5C and 5D illustrate grooves that can generally be described as C-shaped, this is merely exemplary. What is desired more generally is a groove that has a profile (e.g., a cross-sectional orthogonal to the longitudinal, z, direction) that will assure that the contact between the groove surface and the waveguide core will be with its opposing vertical (or substantially vertical) side walls 153, 155 and not with the top surface 159 or the corners 131, 132 at the horizontal edges of the top surface.

A curved groove surface where the contact will be made with the sides 153, 155 of the cores is preferable to a flat surface so that the contact with the core will be a point contact rather than a larger surface contact. Particularly, it is generally easier to fabricate smaller area (i.e., a point) precise tolerances than a larger area.

Figure 6A:
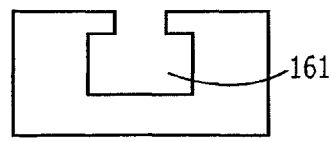
FIGS. 6A through 6C illustrate alternate groove profiles in accordance with the principles of the present invention.
Figure 6B:
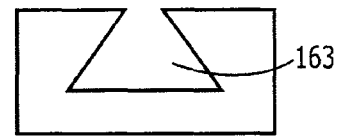
Figure 6C:
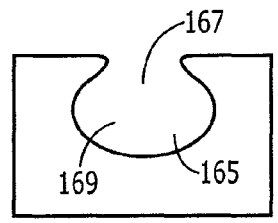

FIGS. 6A-6C illustrate a few other exemplary groove profiles. FIG. 6A shows a generally square-shaped groove 161. FIG. 6B shows a generally trapezoidal groove 163. Finally, FIG. 6C illustrates a generally circular groove 165 comprising an arc segment of a circle, the arc segment exceeding 180° so that the mouth 167 is smaller than the interior 169 of the groove 167.

FIGS. 7A through 7M illustrate one exemplary process for assembling a plurality of optical transports to a ferrule in accordance with the present invention. In this example, the cable comprises forty-eight waveguide cores comprised of four rows of twelve cores each.

Figure 7A:
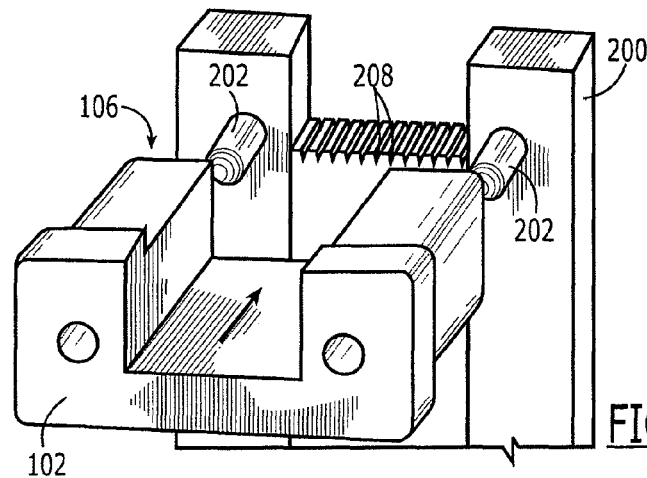
FIGS. 7A through 7M illustrate various stages in a process for assembling a ferrule with multiple optical transports in accordance with one embodiment of the invention.

Turning to FIG. 7A, the ferrule 102 is mounted on the alignment pins 208 of the jig 200 so that the front face 106 of the ferrule 102 abuts the surface 222 of the jig.

Figure 7B:
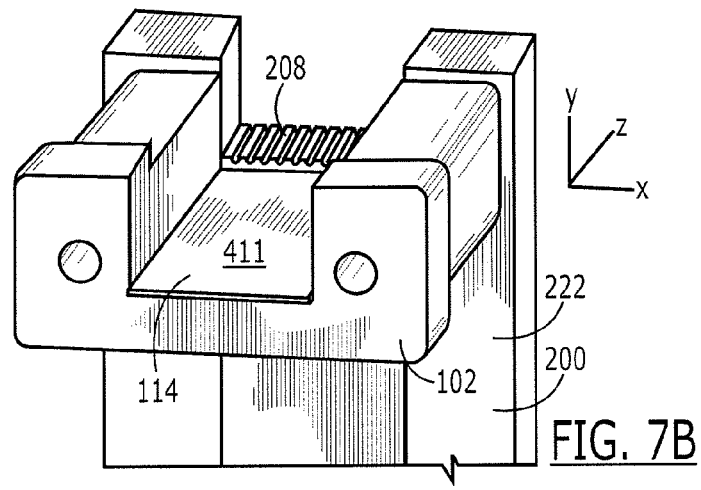
Figure 7C:
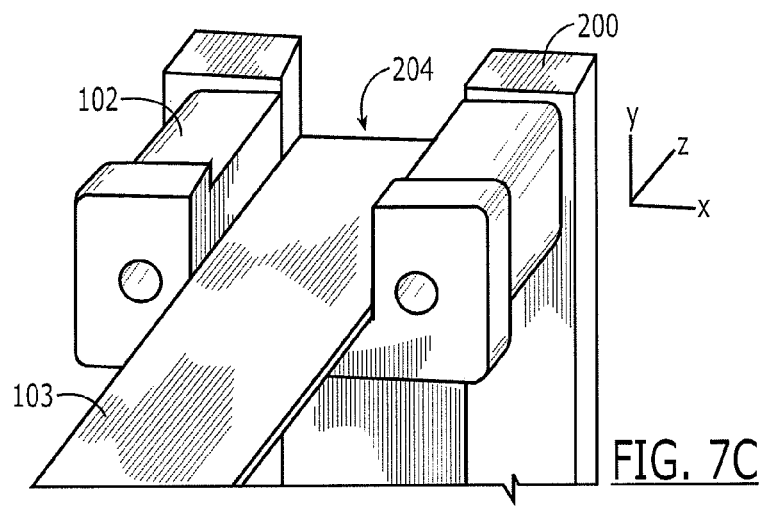
Figure 7D:
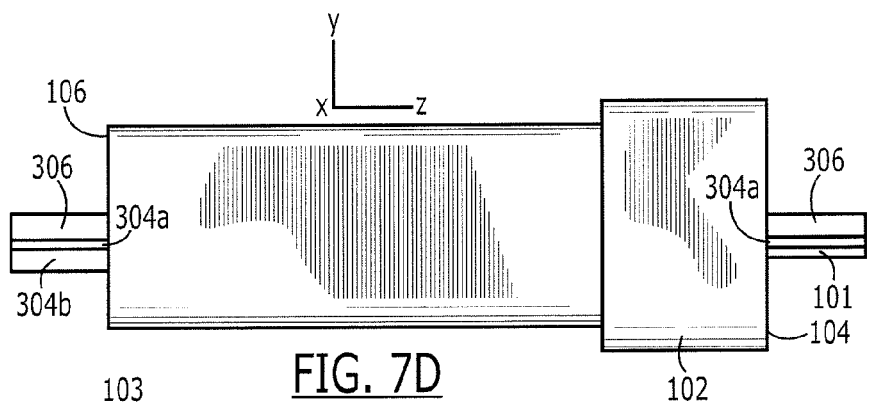

Next, as shown in FIG. 7B, a layer of adhesive 411 is deposited on the bottom surface of the ferrule cavity 114. Next, referring to FIG. 7C, a first optical wave guide layer 103, comprising a row of twelve cores, is placed on the adhesive 411 in the ferrule 102 with the front portion (e.g., portion 311 in FIG. 3) extending into the cavity 204 of the jig 200. Particularly, the front end of the wave guide is positioned so that it extends at least partially into the cavity 204 of the jig 200 so that the fully clad portions of the waveguide cores extend completely through the ferrule. The proper position is shown in FIG. 7D, which is a side view of the ferrule 102 and first layer of waveguides 103. As can be seen, the support substrate 306, first cladding layer 304a, and cores 101 extend past the front face 106 of the ferrule 102, while the second cladding layer 304b ends essentially at the front face 106 of the ferrule 102. In some embodiments, the jig may include one or more protrusion that prevents the front face 106 of the ferrule 102 from being inserted onto the jig 200 with the front face flush with the surface 222 of the jig 102, but instead leaving a small gap so that any tiny segment of the second cladding layer 304b sticking out past the front face 106 of the ferrule will not contact the jig and potentially interfere with the proper height alignment of the cores 101 in the Grooves 208. However, if the distance that the second cladding layer extends beyond the front surface of the ferrule is fairly small, it is unlikely to have a significant effect on the proper vertical alignment of the cores.

Figure 7E:
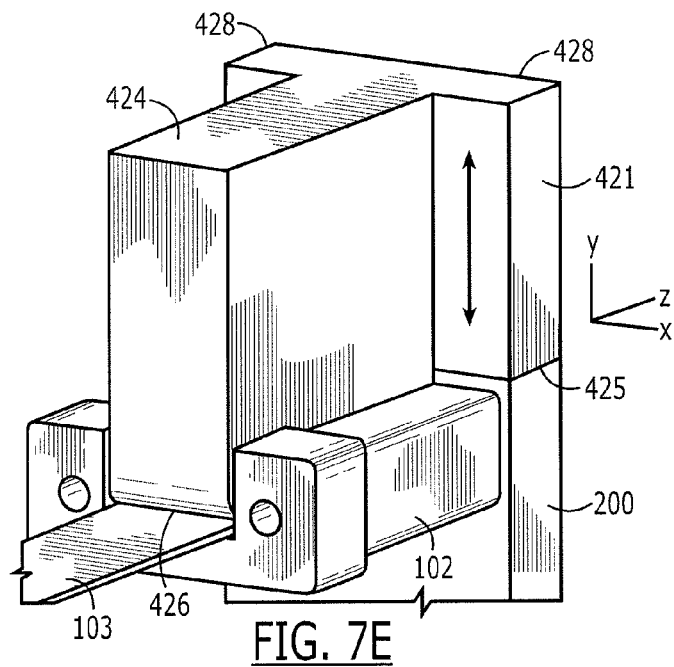

Referring next to FIG. 7E, a hot pressure/curing die tool is used to deploy a die 421 to press down on the layer 103 of wave guide cores 101 and heat up to cure the adhesive 411. Preferably, the press face 426 of the die 421 is sized and shaped to essentially fill the entire cavity 114 in the ferrule 102 so as to maintain constant pressure on the waveguide layer 103 over its entire extent in the ferrule and to evenly cure the adhesive 421. The pressure applied by the hot pressure/ curing die 421 may be selected to push down on the wave guide layer 103 with a predetermined force so as to even more precisely control the vertical position/alignment of the wave guides (y dimension). Particularly, the cores and cladding of a typical optical waveguide actually are somewhat resilient, having a Shore durometer value typically of about D 70 and D 50, respectively. Thus, a predetermined amount of pressure can be chosen so as to press the cores and cladding down into the grooves a desired amount to precisely align them vertically before they are cured in place. Alternately or additionally, the die includes a stop face 425 that is positioned to contact the top of the jig 200 and is disposed at a height relative to the main portion 424 of the die (the portion that goes into the ferrule cavity 114 and touches the waveguide layer 103) to cause the press face 426 of the main portion 424 to stop at a specifically defined height above the bottom of the cavity 204 of the jig 200.

As an alternate to temperature curing, the adhesive may be cured by ultraviolet light curing. Such alternate curing techniques have the advantage of not requiring exposing the ferrule to high temperatures, which can create manufacturing difficulties when the various materials being heated have different coefficients of thermal expansion.

Figure 7F:
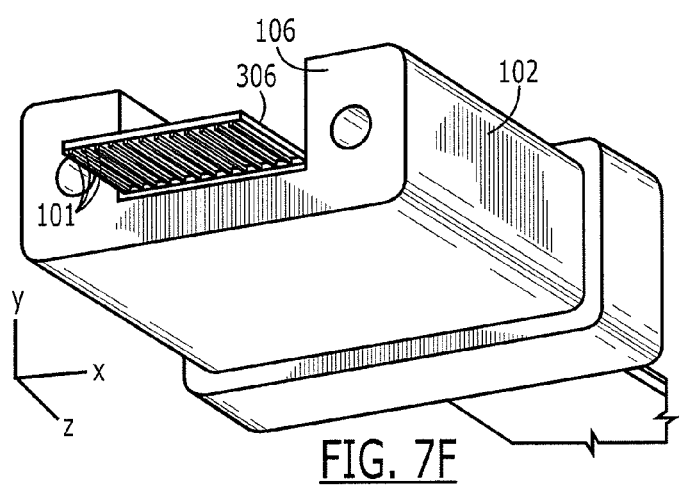

FIG. 7F is a perspective view showing the ferrule 102 and waveguide layer 103 at this point in this process. As can be seen, the cores 101, substrate 306, and first cladding layer 304*a* are extending past the front face 106 of the ferrule 102.

Figure 7G:
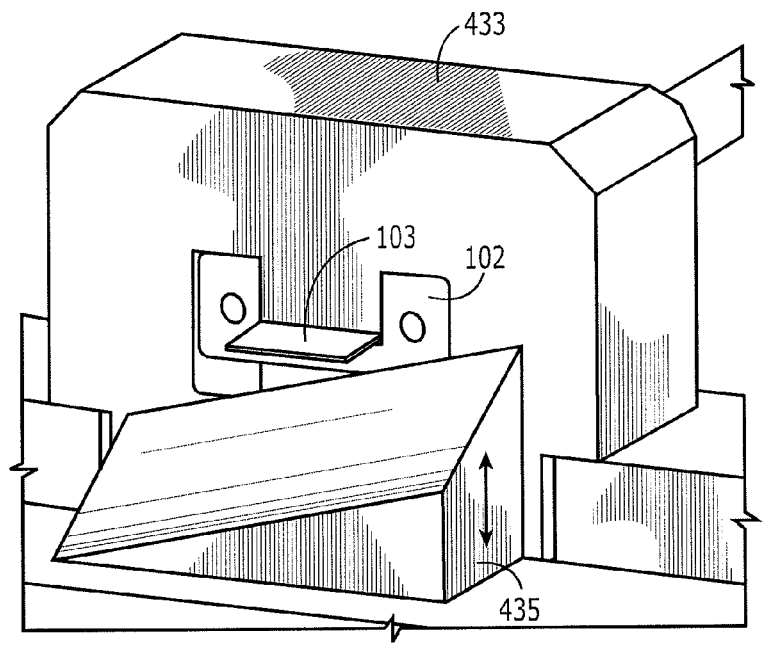
Figure 7H:
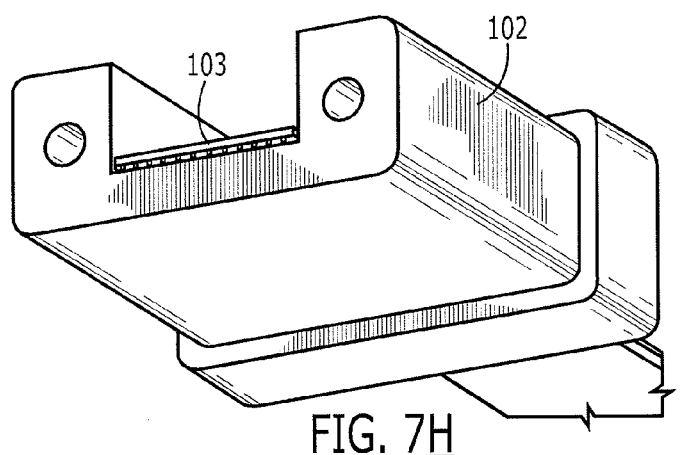
Figure 7I:
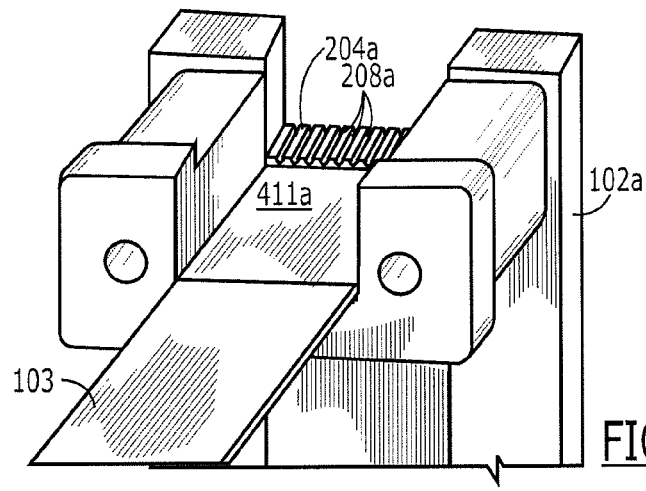

Next, referring to FIG. 7G, the ferrule 102 is placed in a cutting die 433 and a cutting knife 435 cuts the end of the waveguide layer 103 flush with the front face 106 of the ferrule 102. Alternately, the front of the waveguide layer 103 can be removed by laser cleaving. FIG. 7H shows the ferrule 102 and waveguide layer 103 after cutting.

At this point, the first waveguide layer 103 is completely assembled to the ferrule 102.

Figure 7J:
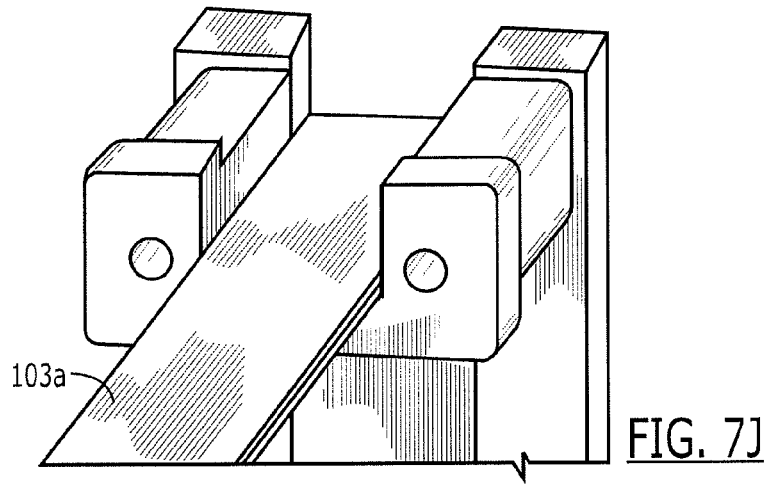
Figure 7K:
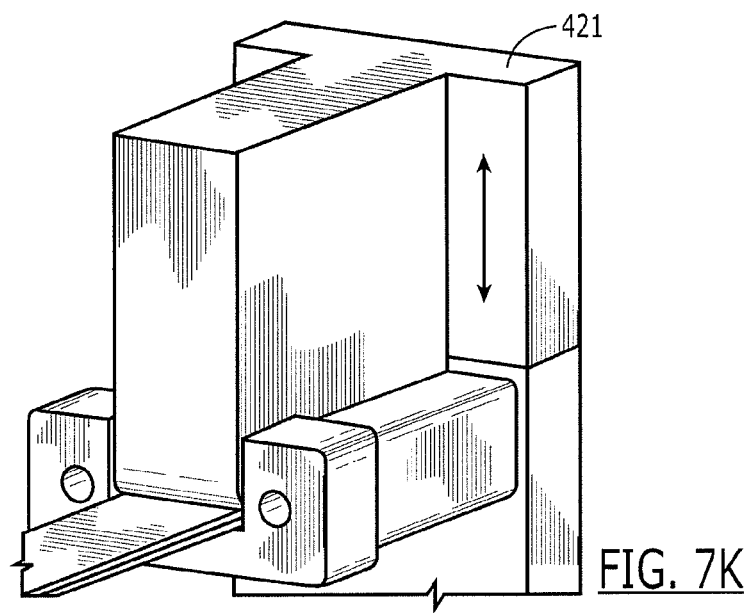

Essentially, the same process described herein above may be repeated for each additional waveguide layer 103. Particularly, with reference to FIG. 7I, the ferrule 102 is next mounted to a different jig 102*a*. This jig 102*a* is essentially identical to the first jig 102, except that the wall 204*a* containing the grooves 208*a* is positioned higher relative to the alignment pins (not shown) by an amount equal to the thickness of one waveguide layer 103 plus one adhesive layer 411. Another layer of adhesive 411*a* is put down on top of the first wave guide layer 103. Referring to FIG. 7J, the next layer of wave guide 103*a* is placed on top of the adhesive layer 411*a*. Then, as shown in FIG. 7K, the hot pressure/curing die 421 comes down to apply downward pressure on the waveguide layer 103*a* and heat the adhesive 411*a* to cure it.

Note that, the adhesive layer may be used to compensate for variations in the heights of the waveguide layers to even further help assure proper vertical alignment of the waveguides. For instance, if the height of the first waveguide layer is less than expected, such that the second waveguide layer would otherwise sit too low in the ferrule, the height of the second waveguide layer may be raised to the proper level by simply making the adhesive layer thicker. In fact, in one embodiment, space for extra adhesive to squirt out from between the waveguide layers is built into the ferrule so that thicker layers of adhesive may be placed between the waveguide layers than might be necessary. Then, when the hot pressure die presses the waveguide layer down, any excess adhesive that would otherwise prevent the overlying waveguide layer from being pressed down to the proper height can squirt out into the additional space. Such additional space may be provided simply by making the width of the cavity 114, e.g., width W1 in FIG. 1A, wider than the width of the waveguide layers.

Figure 7L:
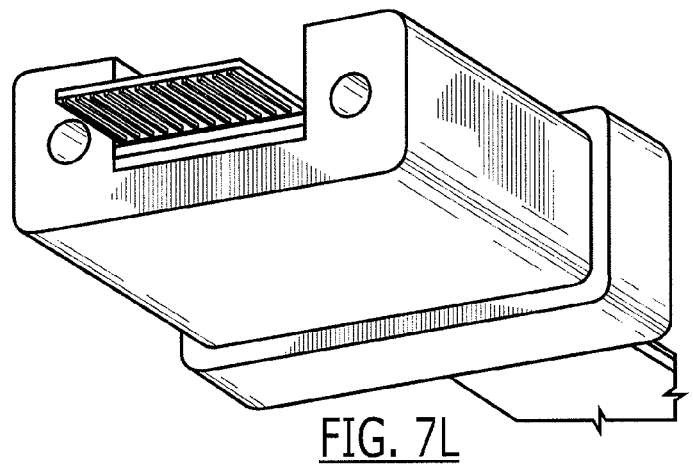
Figure 7M:
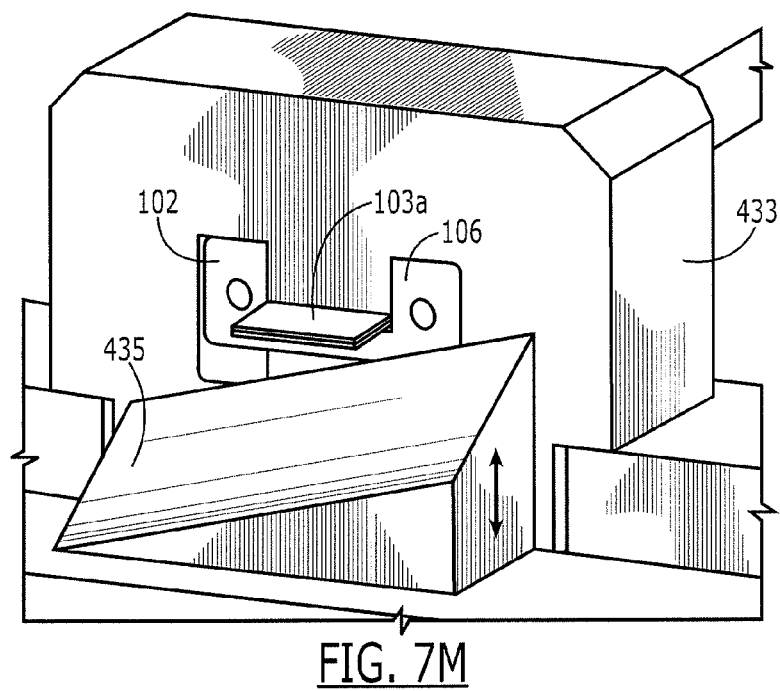

FIG. 7L is a perspective view of the ferrule 102 at this point of the process. Next, as shown in FIG. 7M, the ferrule 102 is again placed in the cutting die 433 and the cutting knife 435 is used to cut the second waveguide layer 103*a* flush with the front face 106 of the ferrule 102.

The same steps can be repeated for as many waveguide layers as desired.

Next, a cover such as cover 112 shown in FIGS. 1A and 1B, may be placed in the remaining space of the cavity 114 of the ferrule 102 to close off the cavity and finish the top of the ferrule completely flush. The cover may be adhered in the opening. More particularly, a layer of adhesive may be placed on top of the top-most layer of optical waveguides and the cover 112 placed on top thereof in contact with the adhesive layer. The adhesive may then be cured to affix the cover in place, such as by heating the entire assembly or by use of the aforementioned hot pressure/curing die 421 on top of the cover 112.

The cover 112 is not necessary for purposes of trapping the waveguides in the cavity insofar as the waveguides are already adhered fixedly in the ferrule. Therefore, the cover 112 may be omitted. However, cover 112 provides additional structural stability to the ferrule. It further causes the ferrule to look more like a traditional ferrule. Even further, it helps divide forces evenly over two mating ferrules. Particularly, if the ferrules in accordance with the present invention are used for hermaphroditic connector mating, then, when two connectors are mated, the ferrule in one of the connectors will be facing up and the ferrule in the other connector will be facing down. Thus, without the covers, the forces in the coupled ferrules may not be evenly distributed because of the asymmetric nature of the mating ferrules. The covers help make the ferrules more symmetric structurally and in terms of force distribution.

While wire EDM can be used to manufacture work pieces, such as the jigs of the present invention, to extremely small tolerances, such as less than one micron, this does not mean that it necessarily is able to form internal features that small. Particularly, the dimensions of internal features of a work piece, such as the grooves, are limited by the size of the wire of the wire EDM machine. For instance, if the wire used in the wire EDM process is ten microns in diameter, then it will essentially be impossible to create any internal space in a work piece that is less than ten microns wide because the wire must fit within the internal space in order to cut the sides of the internal space.

Thus, if, for instance, the opening at the top of a C-shaped groove, such as illustrated in FIGS. 5C and 5D must be smaller than the wire diameter, then it will be impossible to fabricate such a jig.

Figure 8A:
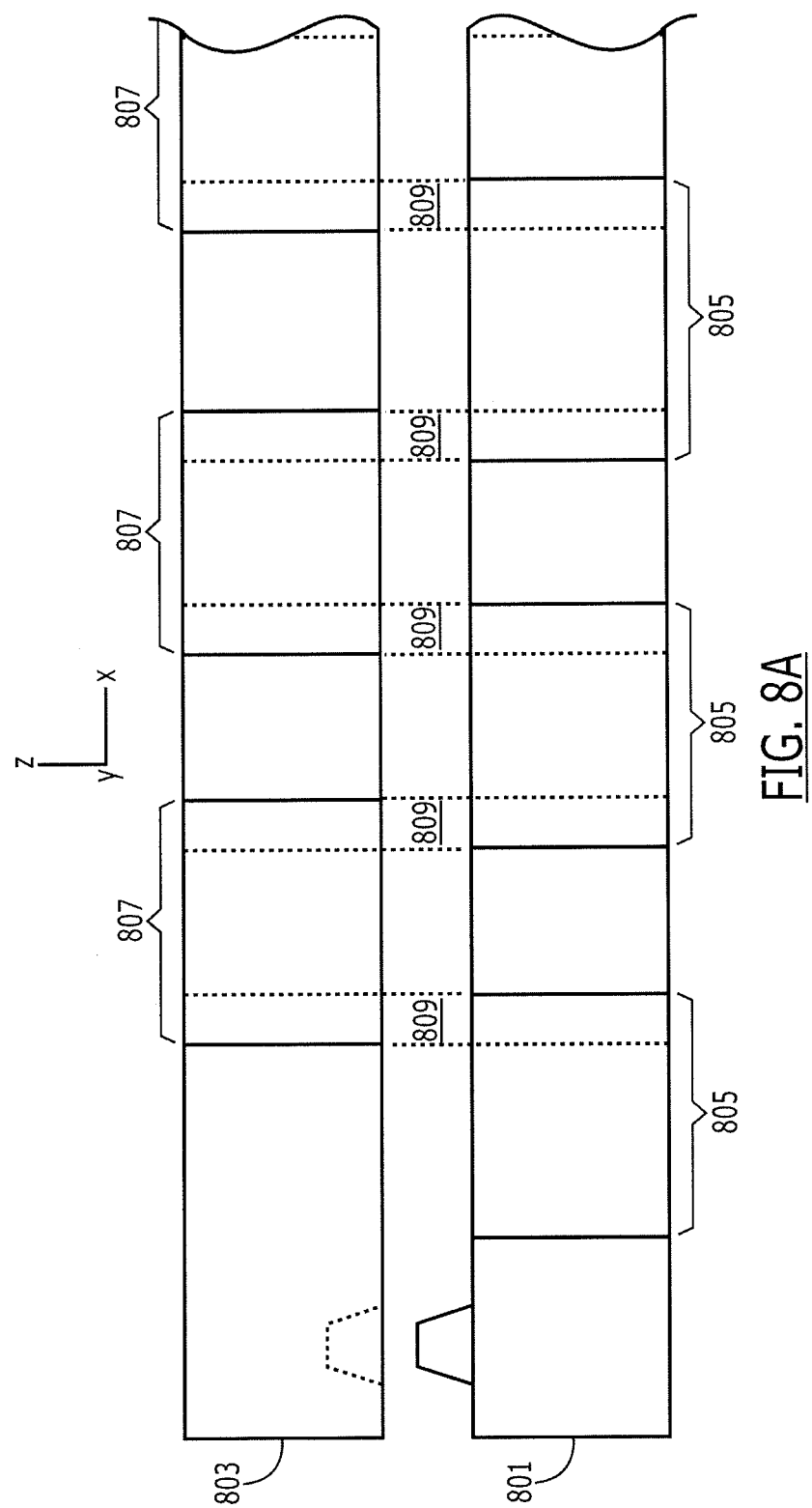
FIG. 8A is a top plan view of the two-piece jig in accordance with the embodiment of FIG. 7 in an assembled state.
Figure 8B:
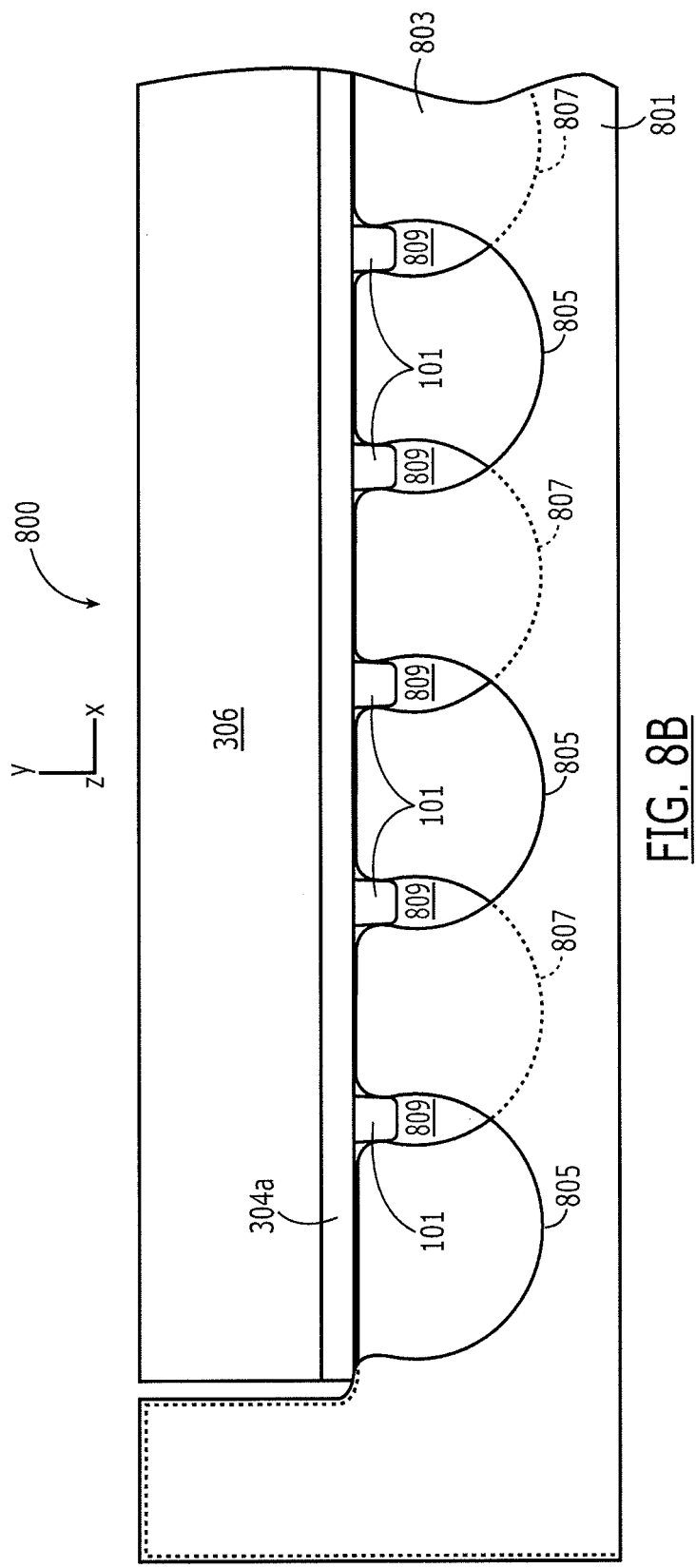
FIG. 8B is a semi-transparent front view of a two-piece jig in accordance with the embodiment of FIG. 7 in an assembled state.

FIGS. 8A and 8B illustrate a two-piece jig 800 that can be fabricated via wire EDM that creates grooves effectively having dimensions smaller than the diameter of the wire of the wire EDM machine. Particularly, by manufacturing two separate jig pieces 801, 803 with half of the effective groove wall in each piece, each piece can be manufactured with channels larger than desired and two such jig pieces 801, 803 can be placed back-to-back longitudinally to create an effective longitudinal full groove of smaller dimension than the wire used to machine the pieces. In one embodiment, the first jig piece 801 and the second jig piece 803, each comprise lateral alignment features 850, 851, respectively, for mounting to each other.

FIG. 8A shows the two jig pieces 801, 803 of the two-piece jig 8A from above, illustrating how they would be assembled together. FIG. 8B is a longitudinal view (z dimension) looking down the effective groove formed when the two jig pieces 801 and 803 are assembled together. In addition, the waveguides 801 are shown in FIG. 8B, including the cladding 304 and substrate 306. The Figures show only about half of the jig pieces.

An exemplary core 101 is shown in just one of the effective grooves (disembodied from its cladding and substrate layers and any other waveguides) for illustrative purposes to demonstrate the uninterrupted longitudinal path in which it lies.

In order to avoid confusion, the groove portions in each individual jig piece 801, 803 will be referred to as "channels" and the effective longitudinal grooves created by the joining of the two jig pieces 801, 803 will continue to be referred to as "grooves" or "effective grooves". Furthermore, we shall use the term "profile" or "profile of the groove" to refer to the straight, uninterrupted longitudinal path through the groove, e.g., the open space that is seen in the longitudinal view down the bore of the groove, as in FIG. 8B. As will become clear from the following discussion, it is preferred not to refer to this profile as a "cross section" because any single cross-sectional lateral plane or slice through the groove (in the xy direction) would only capture half of the "effective groove".

By placing the two jig pieces 801, 802 back-to-back longitudinally and laterally aligning the two jig pieces 801, 803 so that the channels 805 in the first jig piece 801 are laterally offset from the channels 807 in the second jig piece 802, straight, uninterrupted longitudinal paths 809 (the open space in FIG. 8B) can be formed of virtually any desired size and shape. In the example illustrated in FIGS. 8A and 8B, the first (e.g., left-most) effective groove 809 and every alternate groove thereafter (third, fifth, etc.) is defined by the left side of the channel 805 in the first jig piece 801 in combination with the right side of the channel 807 in the second jig piece 803. The second groove 809 and then every alternate groove thereafter is formed by the left side of the channel 807 in the second jig piece 803 and the right side of the channel 805 in the first jig piece 801.

Figure 9:
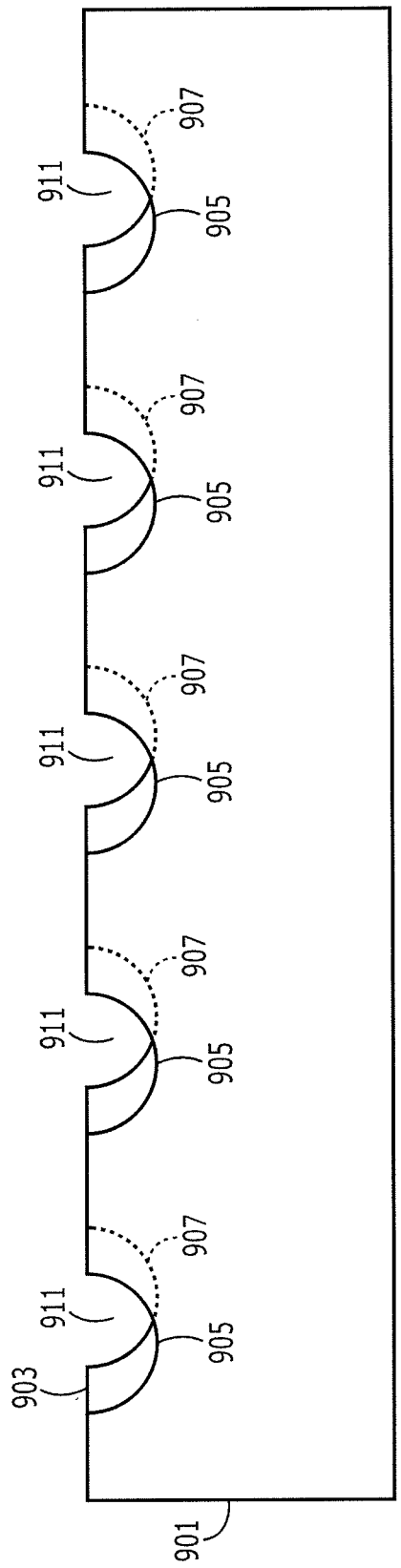
FIG. 9 shows a different embodiment in which only half of each channel in each jig piece forms a part of the groove.

This embodiment is merely exemplary. For instance, FIG. 9 shows a different embodiment in which only half of each channel 905, 907 in each jig piece 901, 903 forms part of the groove 911, with the other half in essence being unused.

As can be seen, the straight, uninterrupted paths in the longitudinal direction between the left sides of the channels of one of the jig pieces and the right sides of the channels of the other jig piece are effective grooves 809 much smaller than the channels 805, 807 of either piece jig. Exemplary dimensions are provided in FIG. 8B.

For instance, as illustrated, jig pieces 801 and 803 are almost identical, each with C-shaped channels 805, 807, respectively, defining 150 micron wide mouths disposed at a pitch of 200 microns. The only difference between the two jig pieces 801, 803 is that their alignment features 813 are horizontally (x direction) offset from the other by one half of the pitch of the grooves (100 microns). Thus, placing the two jig pieces back-to-back longitudinally with their alignment features 813 mated so that their channels are horizontally offset from each other by half the pitch (100 microns) defines effective grooves having profiles with openings of effectively 50 microns. As long as the optical transports are straight and extend far enough beyond the front face of the ferrule to extend into the channels 805, 807 of both jig pieces 801, 803, then that transports will effectively be horizontally trapped in the 50 micron wide (at the mouths) profile of the effective grooves 809.

Accordingly, by forming effective grooves having profiles defined by two separately manufactured pieces placed back-to-back longitudinally, one can manufacture effective grooves of a much smaller dimension than can be manufactured in a single piece.

The invention provides a simple system for aligning a large number of optical transports in a ferrule very efficiently and precisely. The process is time efficient because all of the optical transports in each row of transports are essentially aligned, cured in place, and cut simultaneously.

Further, the jigs can be produced inexpensively because they may be manufactured by two dimensional wire EDM, which can produce extremely accurately machined pieces (e.g., less than one micron tolerances) inexpensively.

While the specific embodiments discussed above relate to waveguides, it should be apparent that the inventive methods and apparatus are equally useful in connection with optical fibers. Furthermore, although the term optical has been used throughout this specification, it is merely exemplary and is not intended to limit the wavelength of the electromagnetic radiation that may be transported in the transports. Additionally, note that the use of relative directional terms herein, such as top and bottom, up and down, left and right, horizontally and vertically, or height and width are for reference purposes only and are used in relation to each other based on an assumed orientation of the relevant object, but are not intended to imply that such object must be in such orientation.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A combination for assembling a plurality of optical transports in a ferrule comprising:
   a ferrule having a cavity therethrough in a longitudinal dimension for receiving a row of optical transports, at least a portion of the optical transports disposed on a substantially planar layer of cladding, and a lateral alignment feature; and
   at least one jig having a lateral alignment feature adapted to mate to the lateral alignment feature of the ferrule to laterally align the jig and the ferrule, the jig including a surface having a plurality of grooves therein, wherein the surface and grooves are positioned relative to the alignment feature of the jig and the alignment feature of the jig is positioned relative to the alignment feature of the ferrule such that, when the jig is mounted on the ferrule via the mating alignment features, the grooves of the jig are laterally aligned relative to the ferrule such that transports passing longitudinally though the cavity of the ferrule and longitudinally into the jig and received in the grooves in the jig will be positioned within the cavity of the ferrule in a desired lateral alignment;
   wherein the grooves define an uninterrupted longitudinal path having a lateral profile comprising at least a first portion and a second portion, the first portion having a minimum width in a first lateral dimension substantially parallel to the surface, the second portion in communication with the surface through the first portion, and wherein the second portion of the grooves is wider in the first lateral dimension than the minimum width;
   wherein the grooves are dimensioned relative to the optical transports such that, when the optical transports are positioned in the grooves with the layer of cladding in contact with the surface, the optical transports extend through the first portion of the groove and into, but not beyond the second portion of the groove;

wherein the grooves are sized and shaped relative to the optical transports so that the optical transports passing longitudinally through the grooves are aligned in a second lateral dimension orthogonal to the first lateral dimension by virtue of the layer of cladding contacting the surface with the optical transports in the grooves, and the optical transports are aligned in the first lateral dimension by virtue of the optical transports fitting through the minimum width of the first portions of the grooves;

wherein the minimum width is defined between a first point and a second point in the groove and wherein the jig comprises a first jig body and a second jig body, each of the first and second jig bodies defining a portion of the lateral profile and wherein the first point is on the first jig body and the second point is on the second jig body;

wherein the first jig body comprises a plurality of first longitudinal channels and the second jig body comprises a plurality of second longitudinal channels and wherein the first and second jig bodies are aligned laterally with each other so that the first and second channels are laterally offset from each other so that the first channels and the second channels partially overlap in the longitudinal direction, the overlaps defining the lateral profile of the grooves.

2. The combination of claim 1 wherein the optical transports are substantially trapezoidal with first and second sides substantially orthogonal to the plane of the layer of cladding, and further: wherein the minimum width is substantially equal to a distance between the first and second sides in a direction orthogonal to the plane of the layer of cladding.

3. The combination of claim 1 wherein the lateral profiles are substantially C-shaped.

4. The combination of claim 1 wherein the lateral profile comprises an arc greater than 180.degree.

5. The combination of claim 1 wherein the first jig body and the second jig body each comprise lateral alignment features for mounting to each other.

6. A jig for aligning at least one optical transport, at least a portion of the optical transport disposed on a substantially planar layer of cladding in a ferrule, the ferrule having a cavity therethrough in a longitudinal dimension for receiving the optical transport and a lateral alignment feature, the jig comprising:

a lateral alignment feature adapted to mate to the lateral alignment feature of the ferrule to laterally align the jig and the ferrule;

a surface having at least one groove therein, wherein the surface and grooves are positioned relative to the alignment feature of the jig and the alignment feature of the jig is positioned relative to the alignment feature of the ferrule such that, when the jig is mounted on the ferrule via the mating alignment features, the groove is laterally aligned relative to the ferrule such that the at least one optical transport passing longitudinally though the cavity of the ferrule and longitudinally into the jig and received in the at least one groove will be positioned within the cavity of the ferrule in a desired lateral alignment;

wherein the at least one groove defines an uninterrupted longitudinal path having a lateral profile comprising a first portion and a second portion, the first portion having a minimum width in a first lateral dimension substantially parallel to the surface and orthogonal to the longitudinal dimension, the second portion in communication with the surface through the first portion and wider in the first lateral dimension than the minimum width, wherein the minimum width is substantially equal to a width of the at least one optical transport parallel to the layer of cladding and the second portion is wider in the first lateral dimension than the minimum width to a depth below the surface at least equal to height of the optical transport perpendicular to the layer of cladding;

wherein the at least one groove is dimensioned relative to the at least one optical transport so that, when the optical transport is positioned in the groove with the layer of cladding contacting the surface the optical transports extend through the first portion of the groove and into, but not beyond, the second portion of the groove;

wherein the minimum width is defined between a first point and a second point in the groove and wherein the jig comprises a first jig body and a second jig body, each of the first and second jig bodies defining a portion of the lateral profile and wherein the first point is on the first jig body and the second point is on the second jig body;

wherein the first jig body comprises at least a first longitudinal channel and the second jig body comprises at least a second longitudinal channel and wherein the first and second jig bodies can be aligned laterally with each other so that the first and second channels are laterally offset from each other so that the first channels and the second channels partially overlap in the longitudinal direction, the overlap comprising the uninterrupted longitudinal path.

7. The jig of claim 6 wherein the optical transport is substantially trapezoidal with first and second sides substantially orthogonal to the plane of the layer of cladding and wherein the minimum width is substantially equal to a distance between the first and second sides in a direction orthogonal to the plane of the layer of cladding.

8. The jig of claim 6 wherein the lateral profile of the at least one groove is substantially C-shaped.

9. The jig of claim 6 wherein the lateral profile of the at least one groove comprises an arc greater than 180.degree.

10. A jig for laterally aligning in a ferrule a row of optical transports, at least a portion of the optical transports disposed on a substantially planar layer of cladding, the jig comprising:

a first jig body comprising a first surface bearing a first plurality of longitudinal channels therein; and a second jig body comprising a second surface bearing a second plurality of longitudinal channels therein;

wherein the first and second jig bodies can be placed back to back in the longitudinal direction with the first plurality of channels laterally offset from the second plurality of channels in a first lateral direction such that each one of the first plurality of channels and each of the second plurality of channels collectively define an uninterrupted longitudinal path having a lateral profile less wide in the first lateral dimension than either the first channels or the second channels taken alone.

11. A method of aligning a plurality of optical transports disposed on a substantially planar layer of cladding in a ferrule;

laterally aligning the ferrule with a first jig body having a first surface bearing a first plurality of longitudinal channels therein;

laterally aligning the ferrule and first jig body with a second jig body having a second surface bearing a second plurality of longitudinal channels therein with the first and second surfaces parallel and the first plurality of channels laterally offset from the second plurality of channels in a first lateral direction parallel the first and second surfaces and orthogonal to the longitudinal dimension such that each one of the first plurality of channels and each one of each of the second plurality of channels collectively define an uninterrupted longitudinal path having a lateral profile less wide in the first lateral dimension than either the first channels or the second channels taken alone;

placing a plurality of optical transports longitudinally through the ferrule, with a front end of each optical transport extending into one of the channels of the first jig body and one of the channels of the second jig body defining one of the paths; and affixing the plurality of optical transports to the ferrule while the front ends of the optical transports are extending into one of the channels of the first jig body and one of the channels of the second jig body defining one of the paths.

12. The method of claim 11 further comprising: removing any portion of the front ends of the optical transports longitudinally extending beyond the ferrule after affixing.

13. The method of claim 11 wherein the profiles are C-shaped.

* * * * *